(12) United States Patent
Kempf et al.

(10) Patent No.: US 11,156,429 B1
(45) Date of Patent: Oct. 26, 2021

(54) CROSSBOW WITH INTEGRAL COCKING WORM GEAR DRIVEN SPOOL

(71) Applicant: Archery Innovators, Tiffin, IA (US)

(72) Inventors: James J. Kempf, Coralville, IA (US); Rex E. Isenhower, Mount Pleasant, IA (US)

(73) Assignee: ARCHERY INNOVATORS, LLC, Tiffin, IA (US)

( * ) Notice: Subject to any disclaimer, the term of this patent is extended or adjusted under 35 U.S.C. 154(b) by 0 days.

(21) Appl. No.: 16/812,874

(22) Filed: Mar. 9, 2020

(51) Int. Cl.
*F41B 5/12* (2006.01)
*F16H 1/16* (2006.01)

(52) U.S. Cl.
CPC .................. *F41B 5/12* (2013.01); *F16H 1/16* (2013.01)

(58) Field of Classification Search
CPC .................. F41B 5/12; F41B 5/123
See application file for complete search history.

(56) References Cited

U.S. PATENT DOCUMENTS

| | | | |
|---|---|---|---|
| 5,220,906 A * | 6/1993 | Choma | F41B 5/12 124/25 |
| 8,950,385 B1 * | 2/2015 | Khoshnood | F41B 5/12 124/25 |
| 9,052,154 B1 * | 6/2015 | Prior | F41B 5/126 |
| 9,341,432 B1 * | 5/2016 | Wohleb | F16H 25/20 |
| 9,404,706 B2 * | 8/2016 | Khoshnood | F41B 5/12 |
| 9,719,749 B1 * | 8/2017 | Prior | F41B 5/0094 |
| 9,958,232 B1 | 5/2018 | Egerdee et al. | |
| 10,139,188 B2 * | 11/2018 | Shaffer | F41B 5/12 |
| 10,900,737 B1 * | 1/2021 | Hensel | F41B 5/1469 |
| 10,900,738 B1 * | 1/2021 | Hensel | F41B 5/12 |

* cited by examiner

*Primary Examiner* — John A Ricci
(74) *Attorney, Agent, or Firm* — Donald J. Ersler

(57) ABSTRACT

A crossbow with a cocking mechanism having a worm gear assembly coupled with a spool, that may also be utilized with an optional built in, removable motor gearbox assembly and power source. The motor gearbox assembly may or may not have a clutch assembly, when rotational force reaches a predetermined amount, rotation of the drive shaft stopses. Switches may be provided to start, stop, and reverse the direction of rotation of the motor gearbox assembly, as well as switches and or circuits that may control operation of the motor gear set.

10 Claims, 11 Drawing Sheets

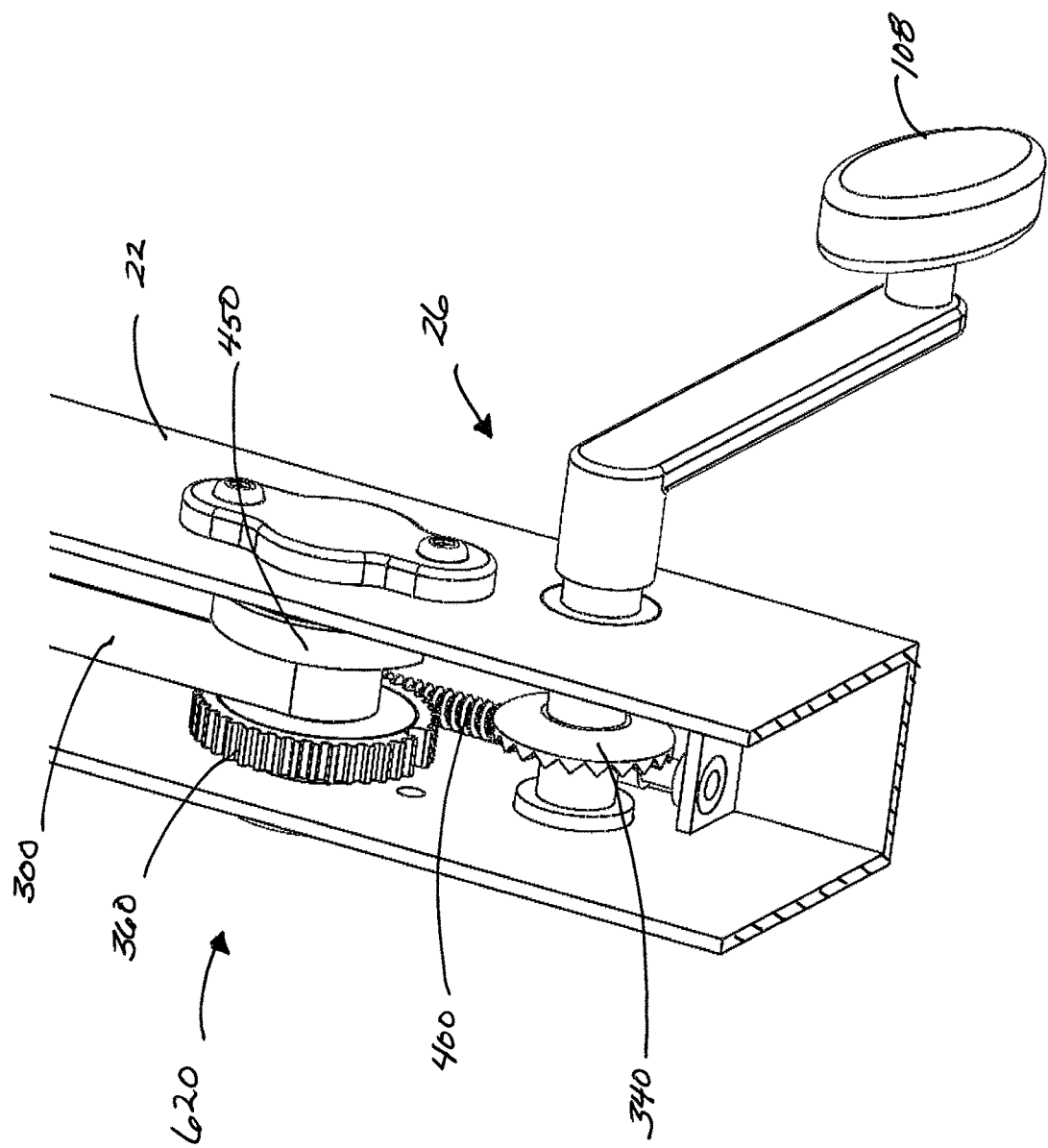

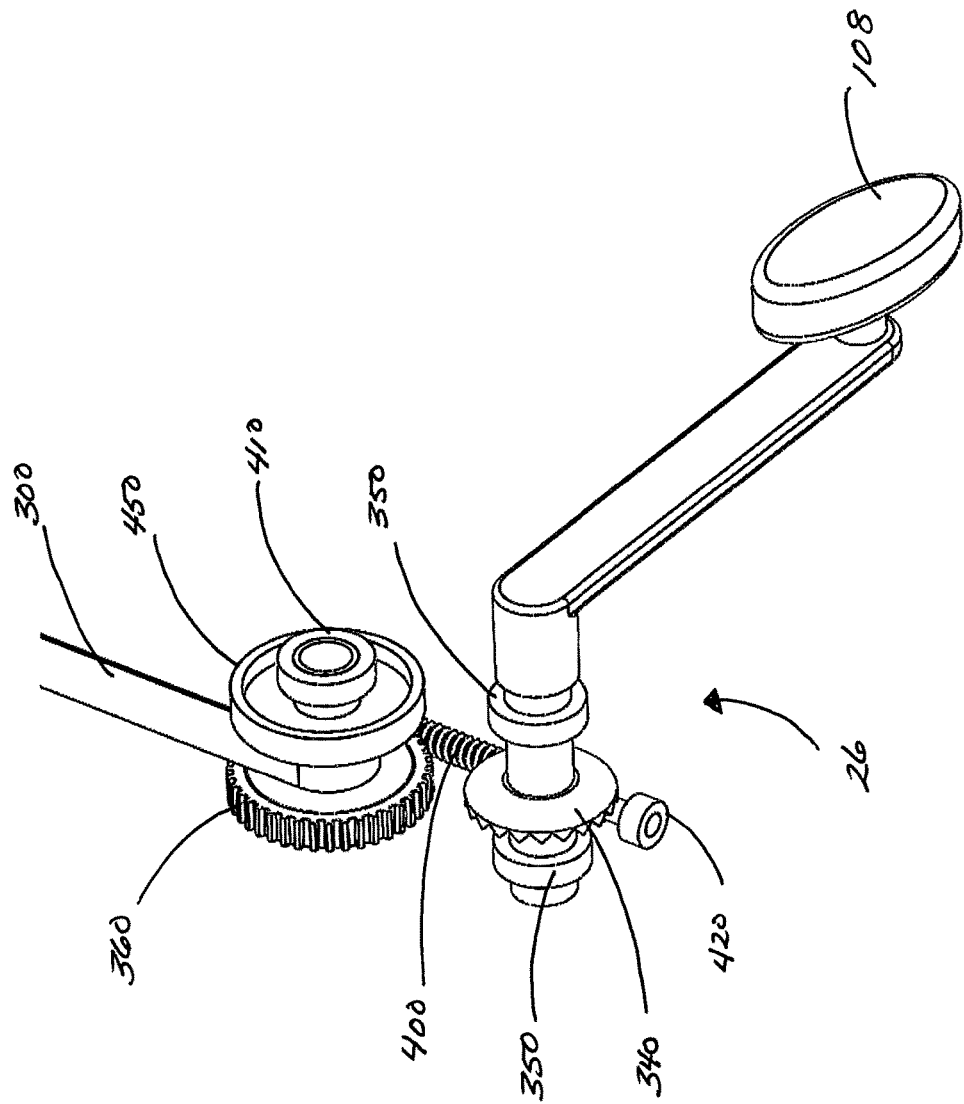

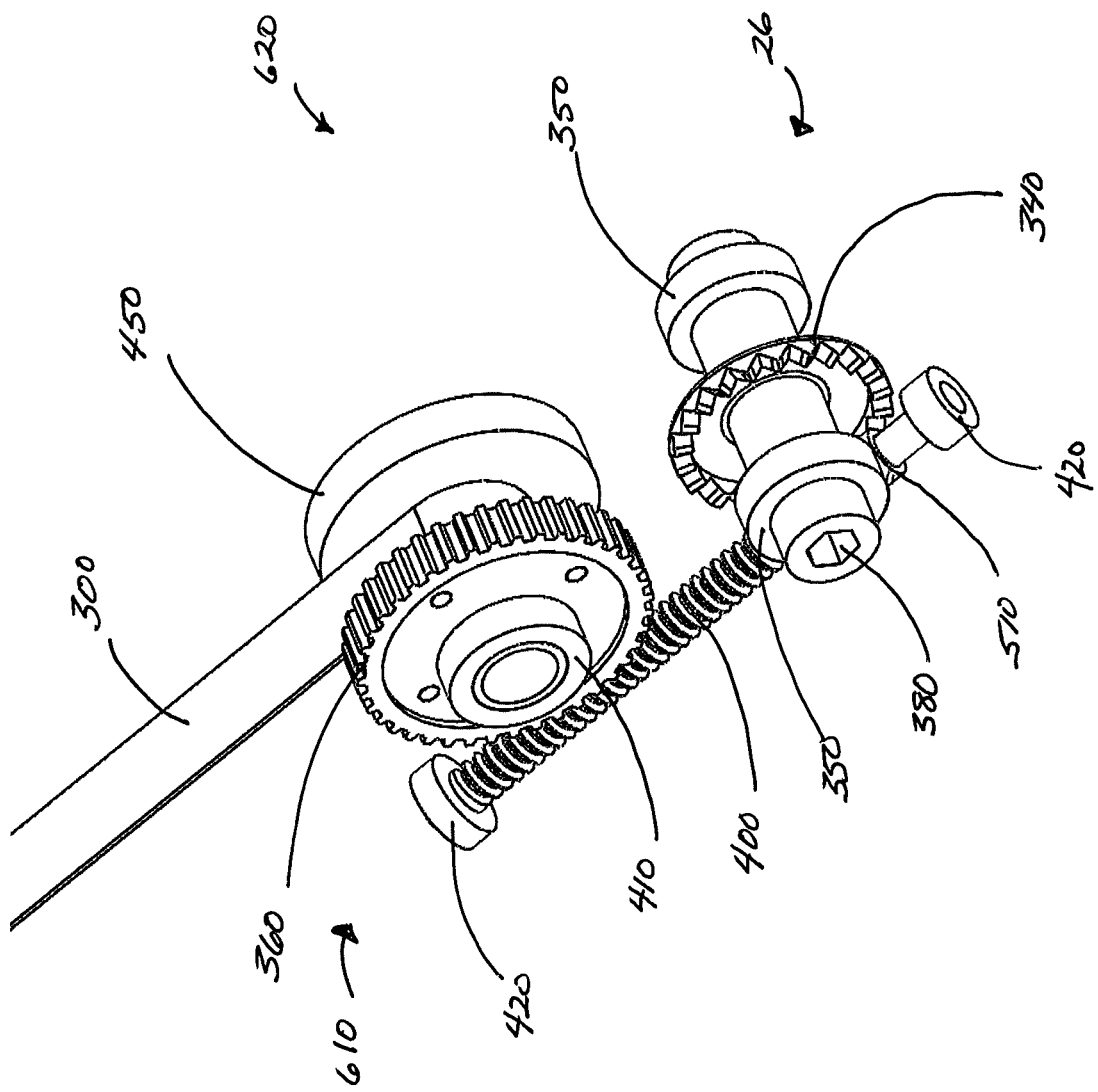

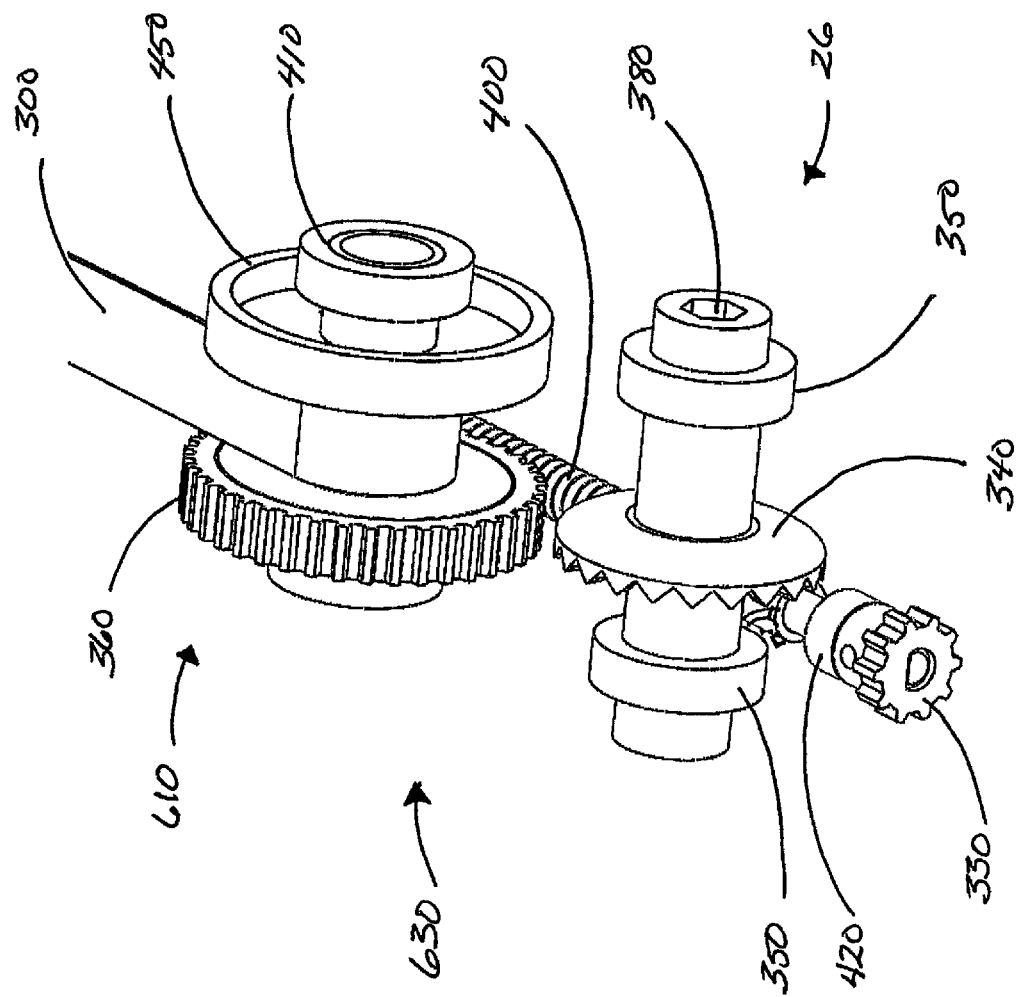

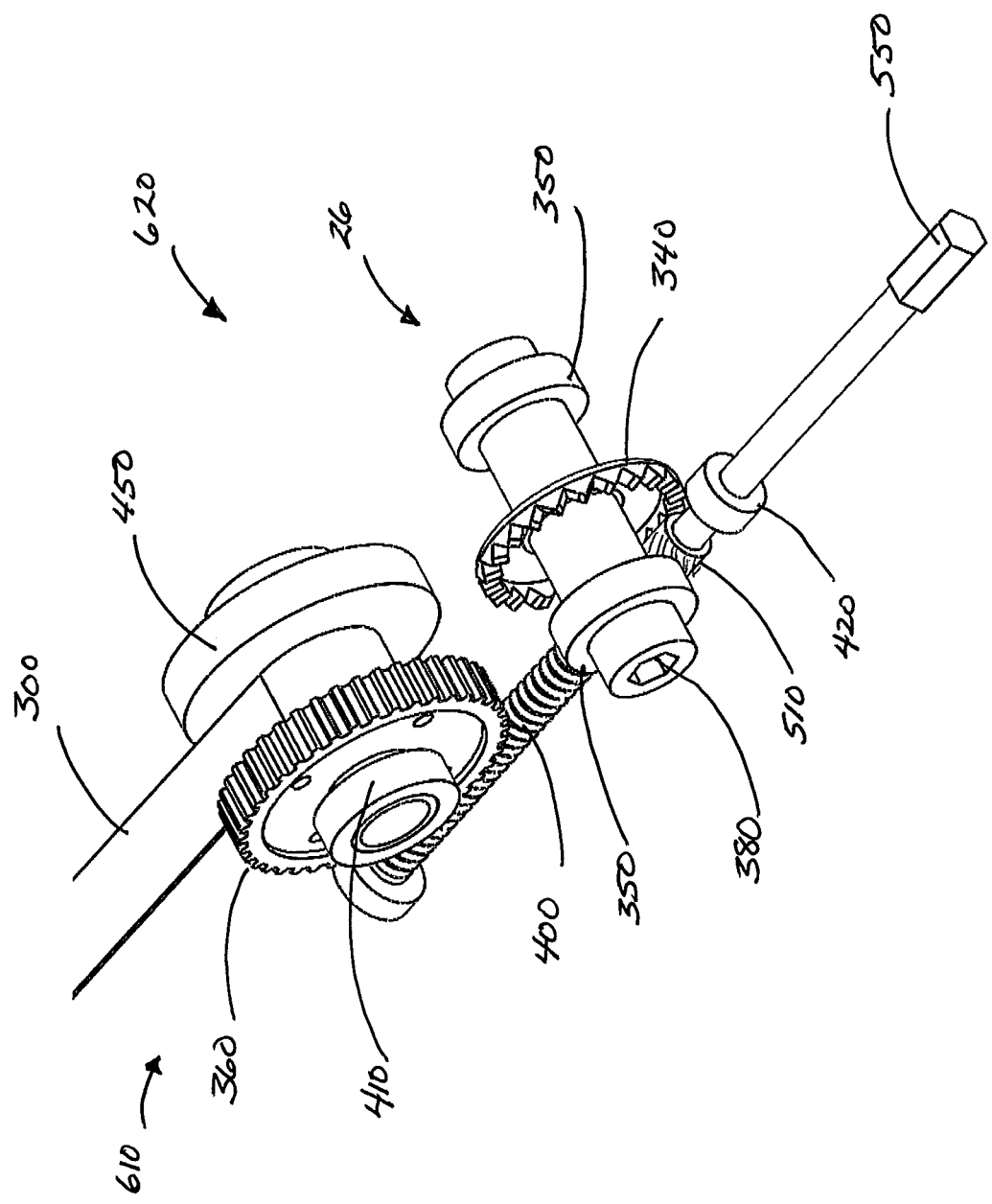

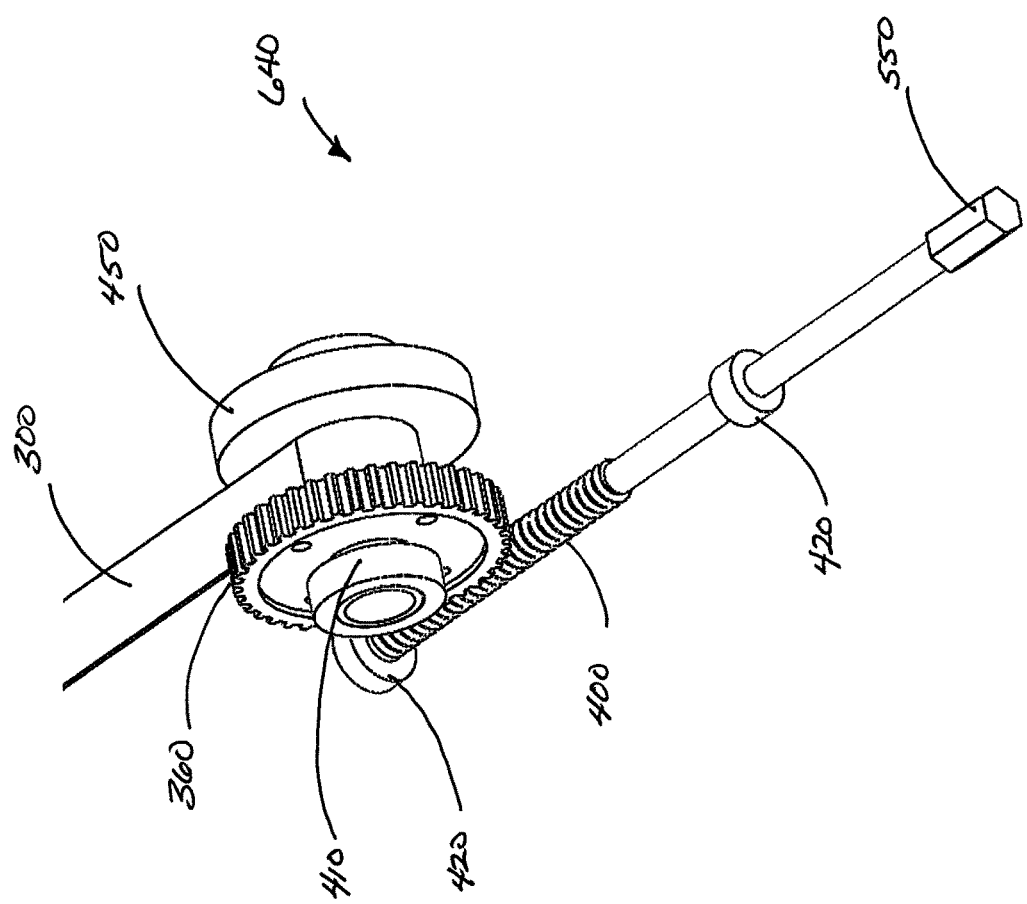

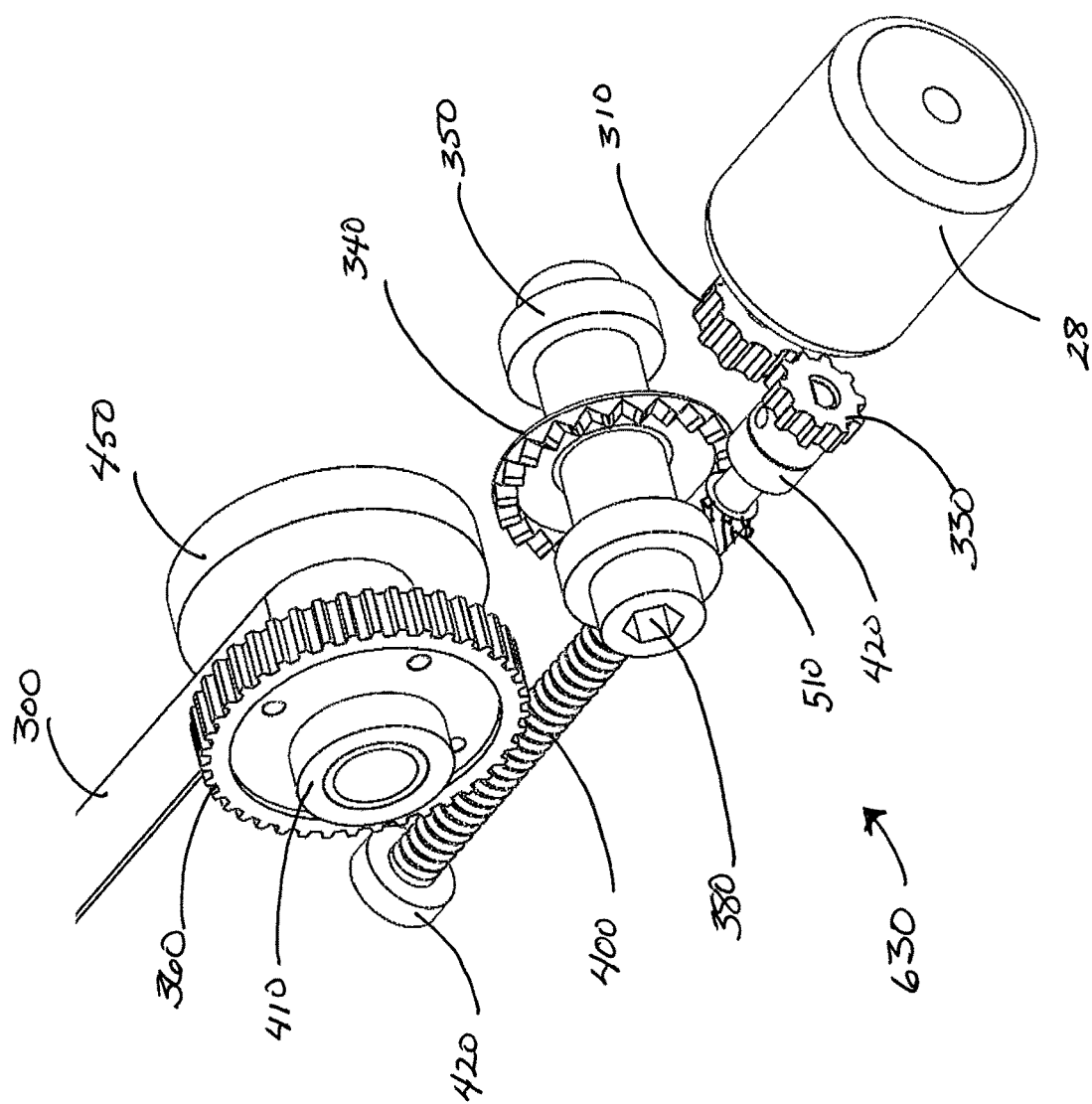

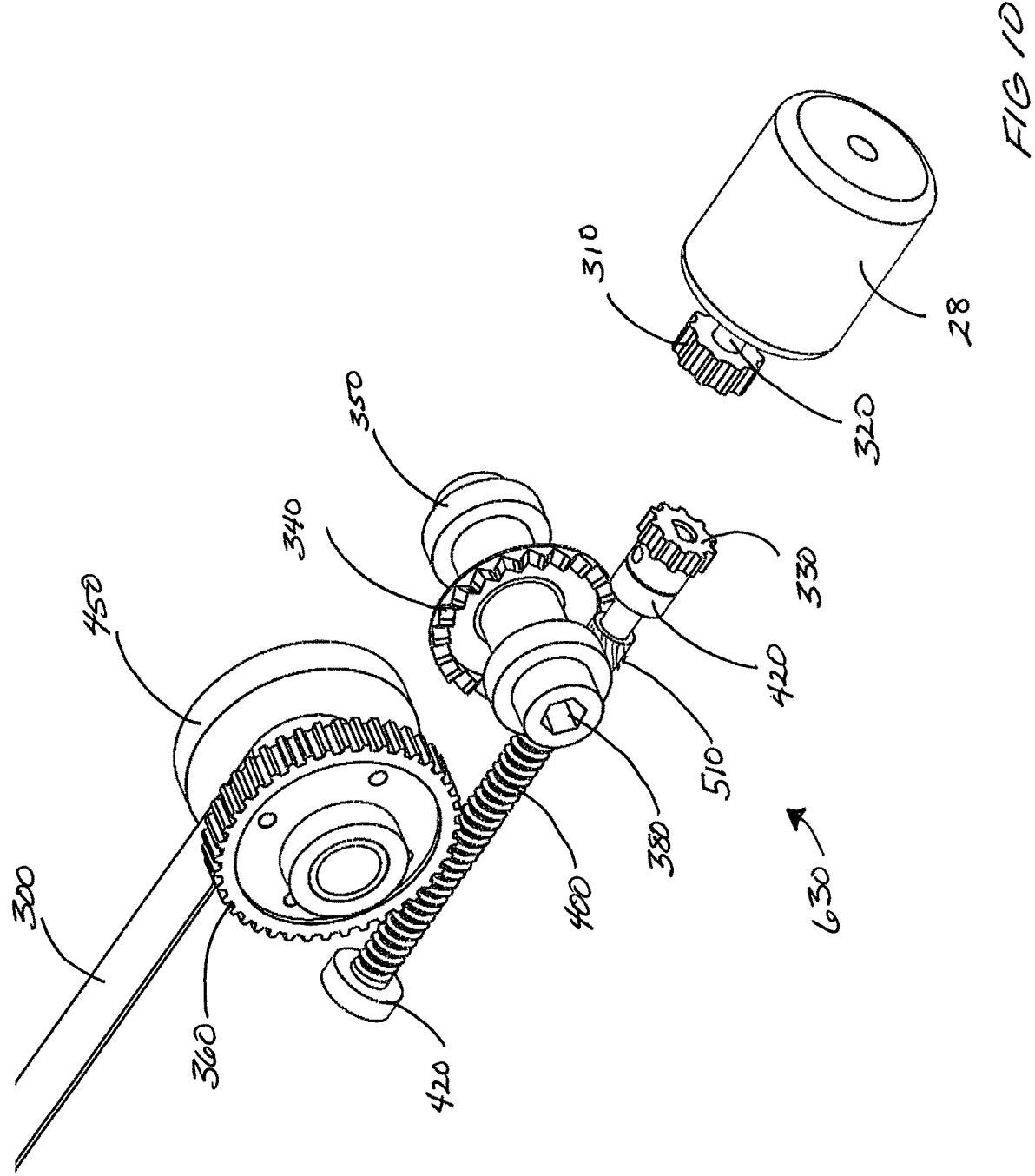

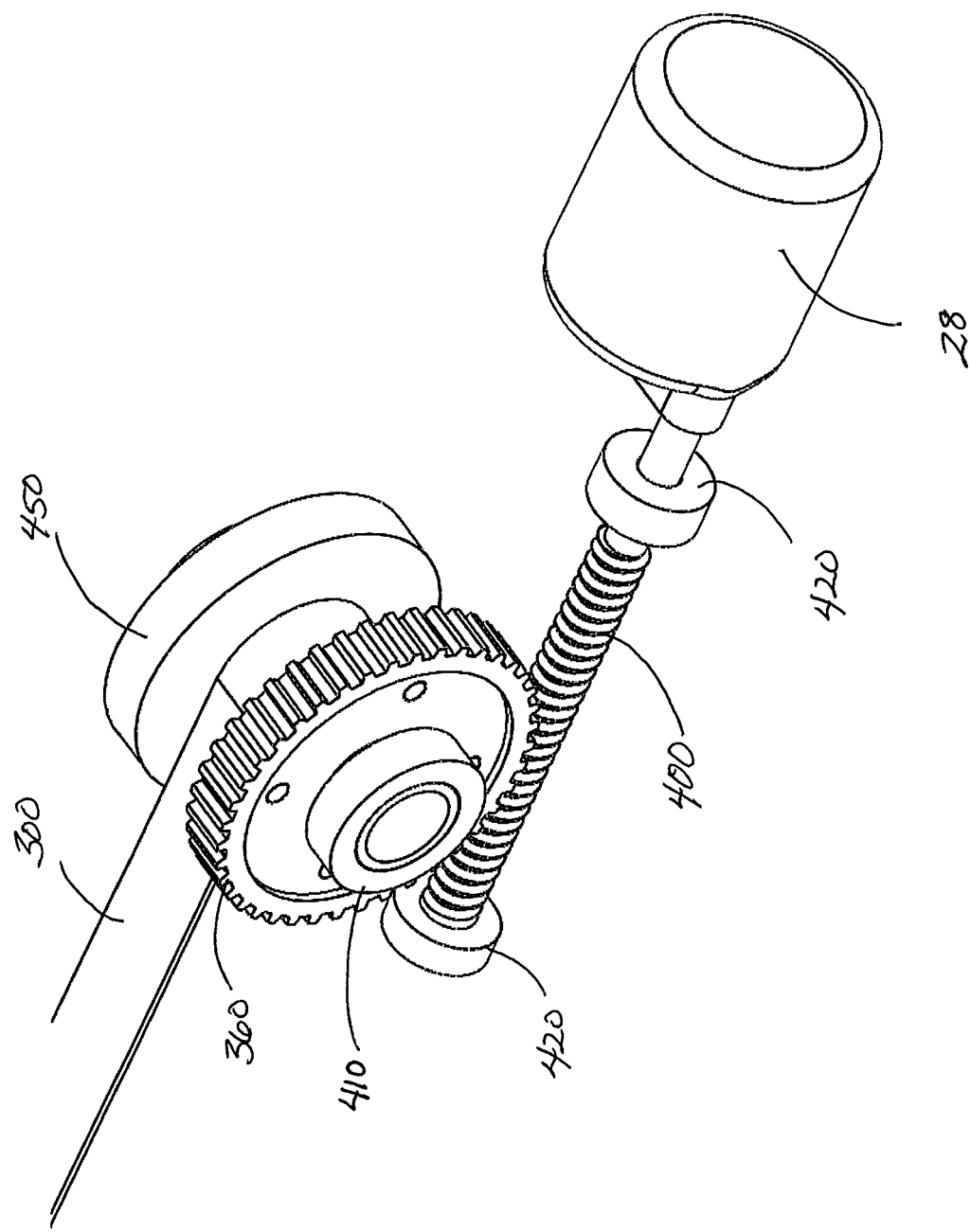

CROSSBOW WITH INTEGRAL COCKING WORM GEAR DRIVEN SPOOL

BACKGROUND OF THE INVENTION

1. Field of the Invention

The present invention relates generally to archery and more specifically to a crossbow with integral cocking and de-cocking moving latch assembly, which may include a removal electric motor.

2. Discussion of the Prior Art

It appears that the prior art does not teach or suggest a crossbow with integral cocking, de-cocking, and a moving latch assembly utilizing a worm gear.

SUMMARY OF THE INVENTION

The enclosed invention discloses a crossbow, and more specifically a built in cocking mechanism for a crossbow that couples a worm gear with a spool, and may also be utilized with an optional built in, removable motor gearbox assembly and power source. The motor gearbox assembly may or may not have a clutch assembly, whereby the rotational force applied by the said motor gearbox assembly reaches a predetermined amount of force, the rotation of the main drive shaft ceases. A switch may be provided as to start, stop, and reverse the direction of rotation of the motor gearbox assembly, as well as switches and or circuits that may control operation of the motor gear set. A worm gear drive is provided having an external drive receiver and an internal worm gear drive assembly. The worm gear drive may be operably coupled to a spool, or may be integrated with the spool. The spool is operably coupled with a connecting means to connect the spool with a movable string latch assembly or string hook (string retainment device). The spool winds and unwinds the connecting means to and from the spool, allowing movement of the string retainment device. The motor gearbox assembly may be operably coupled with the internal worm gear drive assembly, selectable from an engagement position and a disengagement position.

In a disengaged position, and external drive force may be engaged with the external drive receiver. Rotation of the external drive force in a first direction causes the spool to unwind the connecting means allowing the movable string retainment device to move forward, and rotation of the external drive force in a second direction causes the spool to wind the connecting means allowing the movable string retainment device to move rearward.

In an engaged position, an internal drive force created by the motor gearbox assembly may be engaged with the internal worm gear drive assembly. Rotation of the internal drive force in a first direction causes the spool to unwind the connecting means allowing the string retainment device to move forward, and rotation of the internal drive force in a second direction causes the spool to wind the connecting means and moving the string retainment device to move rearward. An output shaft and drive gear of the motor gearbox assembly may be fixed relative to the motor gearbox, or may have a first position extended wherein the drive gear engages the internal worm gear drive assembly, and a second position retracted wherein the drive gear disengages the internal worm gear drive assembly.

In a first embodiment having a fixed drive shaft, the motor gearbox assembly is select-ably movable from a first disengaged position to a second engaged position. In a second embodiment, the motor gearbox assembly has a solenoid select-ably extending the drive gear and output shaft to an engaged position, and retracting the drive gear and output shaft to a disengaged position. In a third embodiment, direct drive is utilized coupling the worm gear shaft with an external rotational force. Electrical power may be internal, external, USB, or other methods known in the art of electrical energy supply and transmission. The utilization of a worm gear enables the rotation of the spool to cease as soon as rotational forces are removed from the worm gear, eliminating the need for a pawl, clutches, or any other secondary devices required to cease the rotation of the spool.

BRIEF DESCRIPTION OF THE DRAWINGS

FIG. 3 is a perspective view of an integral cocking assembly having an external drive force engaged with the external drive force receiver of the present invention.

FIG. 4 is a perspective view of an integral cocking assembly having an external drive force engaged with an external drive force receiver of the present invention.

FIG. 5 is a perspective view of an integral cocking assembly of the present invention.

FIG. 6 is a perspective view of an integral cocking assembly having an external drive force receiver, and an internal drive gear, where a motor gearbox assembly is removed, with the worm gear drive assembly of the present invention.

FIG. 7 is a perspective view of a worm drive assembly having an external drive force receiver with a hand crank assembly of the present invention.

FIG. 8 is a perspective view of the assembly having an external drive force receiver of the present invention.

FIG. 9 is a perspective view of an integral cocking assembly having a motor gearbox assembly engaged with a worm gear drive assembly of the present invention.

FIG. 10 is a partially exploded perspective view of an integral cocking assembly having a motor gearbox assembly disengaged from a worm gear drive assembly of the present invention.

FIG. 11 is a perspective view of an alternate embodiment assembly having a motor gearbox assembly directly coupled with a worm gear drive assembly of the present invention.

DETAILED DESCRIPTION OF THE INVENTION

Figure 1A:
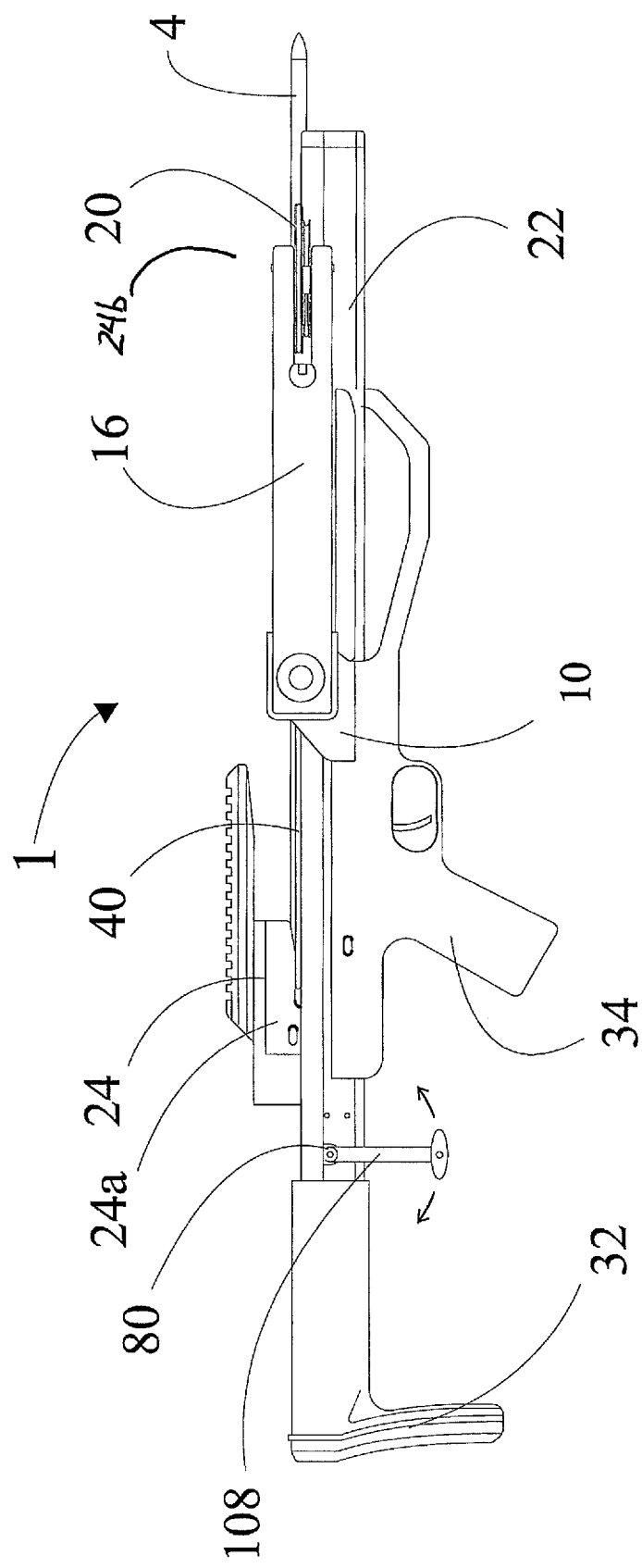
FIG. 1A is a side view of a crossbow with built in crank cocking device having a movable latch housing assembly in the cocked position of the present invention.
Figure 2:
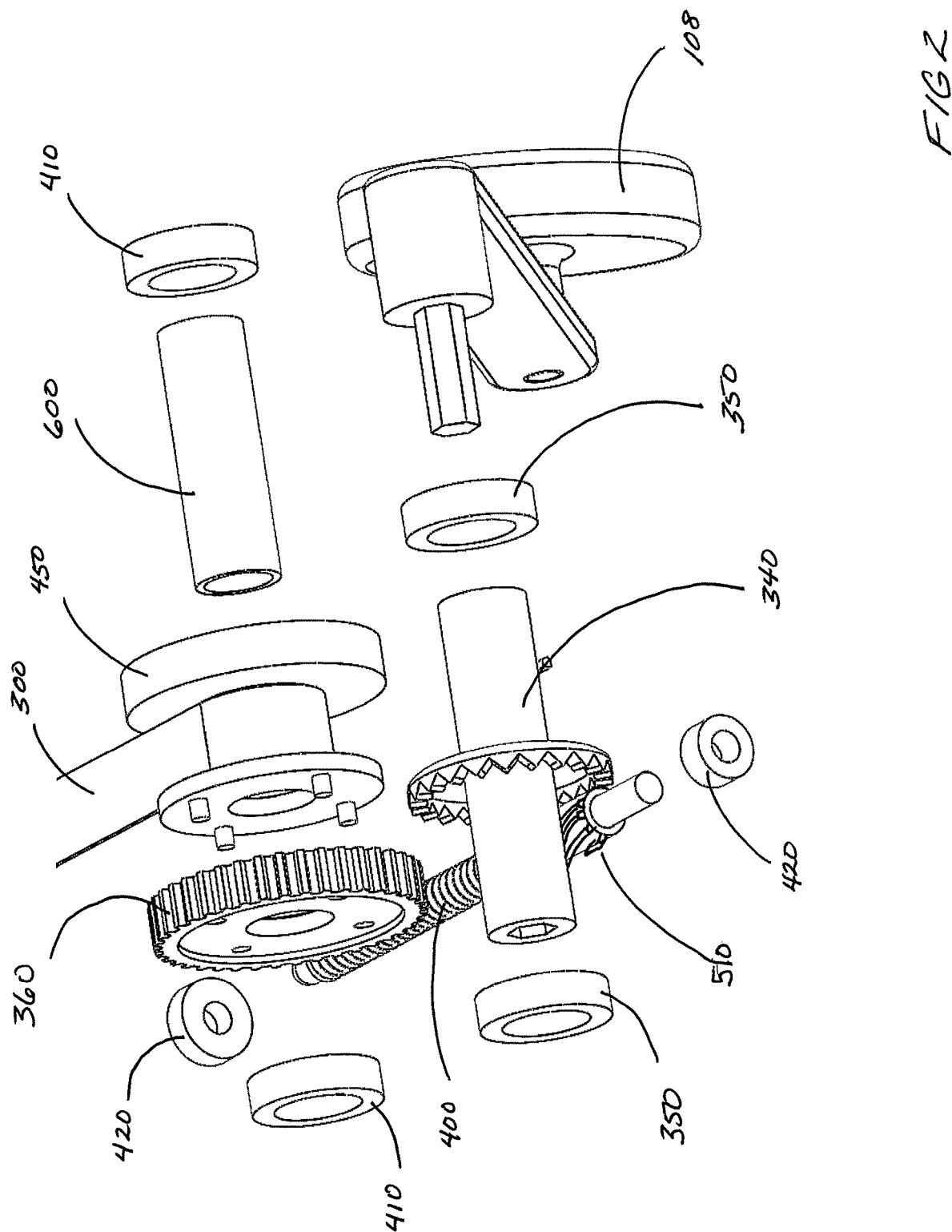
FIG. 2 is an exploded perspective view of an integral cocking assembly of the present invention.

With reference to FIG. 1A, the enclosed invention discloses a crossbow 1, having a butt stock 32, a hand grip 34, a riser 10, a string retainment device 24, and a hand crank 108. With reference to FIG. 2, the crossbow 1 includes a built-in cocking mechanism having a worm gear shaft 400, and worm wheel gear 360 which together with bearings 410 and 420 and support shaft 600 make a worm gear drive assembly 610, that may be utilized with a hand crank assembly 26 comprising a crank drive gear 340, support bearings 350, and an pinion gear 510 as shown in FIGS. 2 and 3, or an optional built in, removable motor gearbox assembly 28.

With reference to FIG. 9, the crossbow 1 uses of a hand crank 108 or a motor gearbox assembly 28 to power a worm gear assembly coupled with a spool 450. As shown in FIGS. 3-5, a hand crank 108 is coupled to a crank drive gear 340 mating to a pinion gear 510. The pinion gear 510 is coupled axially coupled with the worm gear shaft 400. As the hand crank 108 is turned, rotational forces of the hand crank drive gear 340 turn the pinion gear 510, in turn causing rotation of the worm gear shaft 400. As the worm gear shaft 400 rotates, it causes rotation of the worm wheel 360.

When in use, the hand crank 108 is turned a first direction, unwinding the connecting means 300 from the spool 450, allowing the string latch housing assembly 24 to move forward and engage the string 40. Once the string catch 120 is latched to the string 40, the hand crank 108 is rotated in a second direction, winding the connecting means 300 on the spool 450 until the string latch housing assembly 24 is in the ready-to-fire position. A trigger assembly is preferably used as a means to selectively release the string latch housing assembly in the ready-to-fire position.

As shown in FIGS. 6, 9, and 10, the worm gear shaft 400 is coupled to an internal drive gear 330. The internal drive gear 330 may be coupled and de-coupled with the motor gearbox assembly output drive gear 310.

The motor gearbox assembly 28 may or may not have a clutch assembly. When a clutch assembly is present, the rotational force applied by the motor gearbox 28 assembly reaches a predetermined amount of force, the rotation of the output shaft 320 ceases. A switch (not shown) may be provided as to start, stop, and reverse the direction of rotation of the motor gearbox assembly 28.

In use, a clutch assembly in the motor gear assembly 28 would prevent the string latch housing assembly 24 from traveling past the predetermined rearward position of the string latch housing assembly 24 during the cocking procedure. A micro-switch with electronic eye (not shown) may also be used to control the operation of the motor gear box assembly 28. The optional built-in, removable motor gearbox assembly 28 may take the place of the hand crank 108, without removal of the hand crank assembly 26.

Unique to the disclosed invention, is the use of a string retainment device 24 coupled with a spool 450, wherein the rotation of the spool is directly controlled by a worm wheel gear 360. The disclosed hand crank assembly 26 is preferred, however any such system utilizing a rotational force transferred to a worm gear assembly coupled with a spool which moves a string retainment device 24 from a first position 24a to a second position 24b, and again to a first position 24a.

Rotational forces applied to the worm gear drive assembly 610 causes the rotation of the spool 450. The spool 450 is coupled to a first end of a connecting means 300, the second end of the connecting means 300 is coupled to the string retaining means. The worm gear drive assembly 610 may operably couple the worm wheel gear 360 with the spool 450, or integrate the worm wheel gear 360 with the spool 450. As shown in FIGS. 10 and 11, an embodiment having an internal motor gearbox assembly 28 and an external drive force receiver 380.

As illustrated in FIGS. 3 and 5, a manual-only drive assembly 620 has a worm gear shaft 400 and a worm wheel gear 360, an external drive gear 340, and a pinion gear 510. The external drive gear 340 may be a manually driven gear, or a non-manually (powered) driven gear, and is coupled to the pinion gear 510. The pinion gear 510 is coupled with the worm gear shaft 400. Coupled too, or integrated with the worm wheel gear 360 is a spool 450. The spool 450 and the worm wheel gear 360 are supported by a shaft 600. The spool 450 is coupled to a connecting means 300 which coupled the spool 450 with the string latch housing 24. The external drive gear 340 has an external drive force receiver 380, sized to receive an external drive force. A segment of the hand crank 108 is coupled to the external drive force receiver 380. Rotation of the hand crank 108 a first direction unwinds the coupling means 300 from the spool 450 allowing forward movement of the string latch housing 24, and rotation of the hand crank 108 a second direction winds the coupling means 300 on the spool 450 moving the string latch housing 24 rearward. Because of the nature of a worm gear assembly 610, the hand crank 108 may be rotated and stopped at any time of the cocking sequence without the unwanted unwinding of the worm wheel gear 360 and spool 450.

When using the internal motor gearbox assembly 28 for rotational force, the hand crank 108 must be removed to prevent injury. As shown in FIGS. 9 and 10, an alternate embodiment 630 discloses a motor gearbox assembly 28 that is select-ably moveable from a first engaged position or a second disengaged position. The first engaged position allows a motor gearbox assembly drive gear 310 to engage the worm gear drive gear 330. The motor gearbox assembly 28 is selectable from a first rotational force direction and a second rotational force direction. The first rotational force direction unwinds the coupling means 300 from the spool 450 allowing forward movement of the string latch housing 24, and the second rotational force direction winds the coupling means 300 on the spool 450 moving the string latch housing 24 rearward.

An alternate embodiment discloses a motor gearbox assembly 28 that is stationary, having a solenoid (not shown) controlling movement of the motor gearbox assembly output shaft 320 and motor gearbox assembly drive gear 310, moveable from an first disengaged position or a second engaged position. The first position disengaged is rearward, and does not allow the motor gearbox assembly drive gear 310 to engage the worm gear drive gear 330. The second position engaged is forward, and allows the motor gearbox assembly drive gear 310 to engage the worm gear drive gear 330. The solenoid is select-ably activated by the supply of electrical current, and deactivated by the removal of electrical current.

An alternate embodiment disclosed by FIG. 8 has no motor gearbox assembly 28, and is operable only by an external rotational force, such as a hand crank 108, or other means such as an electric screw driver or similar, not shown. Further, an alternative external drive force receiver 550 may be coupled with the worm gear shaft 400 to drive the worm wheel gear 360.

As shown in FIG. 11, the motor gearbox assembly 28 may be directly coupled to the worm gear shaft 400.

The string retainment device 24 may be positioned in the cocked proximal position 24A by the connecting means 300 until fired, or without the connecting means 300, as by a string retainment device block not shown.

Though the preferred embodiment discloses a certain type of external drive gear 340 and pinion gear 510 to rotate the worm gear shaft 400, any type of gear assembly known in the art may be used to rotate the worm gear shaft 400. Such alterations may be the removal of the motor gearbox assembly 28, the use of an external powered rotational force device powering the rotation of the worm gear drive gear 330, or any combination thereof. The motor gearbox assembly 28 may be fixed, slide-able, removable, or external.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A crossbow having an integral crank cocking and de-cocking device comprising:
   a worm gear assembly comprising a worm gear shaft and a worm wheel gear, an external drive gear operably coupled to said worm gear shaft, and a spool, an internal drive gear coupled with said worm gear shaft, wherein said spool is one of coupled axially with said worm wheel gear and integrated axially with said worm wheel gear;
   a connecting means, and a string retainment device, wherein said connecting means is operably coupled with said spool and said string retainment device, and said external drive gear is receivable to an external drive source;
   a motor gearbox assembly comprising an output shaft and an output shaft gear, wherein said output shaft gear is selectable to couple or decouple with said internal drive gear and said motor gearbox assembly is selectable from a first direction of rotation and a second direction of rotation, wherein said output shaft gear is decoupled with said internal drive gear, the external drive source engages said external drive gear, the external drive source rotates said external drive gear in a first or second direction, said first direction for movement of said string retainment device from a first proximal position, to a second distal position, engagement of the bowstring at rest, said external drive source rotates in said second direction which moves said string retainment device and a bowstring to a ready-to-fire said first proximal position and wherein said output shaft gear is coupled with said internal drive gear, said motor gear assembly rotates said drive gear in a first or second direction, said first direction for movement of said string retainment device from a first proximal position to a second distal position, engagement and retainment of the bowstring at rest;
   said motor gear assembly rotates said second direction which moves said string retainment device and the bowstring to said first proximal position; and
   a means to selectively release the bowstring.

2. The crossbow having an integral crank cocking and de-cocking device of claim 1 wherein:
   said external drive source is a hand crank.

3. The crossbow having an integral crank cocking and de-cocking device of claim 1 wherein:
   said external drive source is a hand crank having a clutch.

4. The crossbow having an integral crank cocking and de-cocking device of claim 1 wherein:
   said external drive source is a powered device.

5. A crossbow having an integral crank cocking and de-cocking device, comprising:
   a worm gear assembly comprising a worm gear shaft and a worm wheel gear, a spool, an internal drive gear coupled with said worm gear shaft, wherein said spool is one of coupled axially with said worm wheel gear and integrated axially with said worm wheel gear;
   a connecting means and a string retainment device, wherein said connecting means is operably coupled with said spool and said string retainment device;
   a motor gearbox assembly comprising an output shaft and an output shaft gear, wherein said output shaft gear is coupled with said internal drive gear, and said motor gearbox assembly is selectable from a first direction of rotation and a second direction of rotation, and wherein said output shaft gear is coupled with said internal drive gear, said motor gear assembly rotates said drive gear in a first or second direction, said first direction for movement of said string retainment device from a first proximal position to a second distal position, engagement and retainment of the bowstring at rest, said motor gear assembly rotates said second direction which moves string retainment device and bowstring to said first proximal position; and
   a means to selectively release the bowstring.

6. The crossbow having an integral crank cocking and de-cocking device of claim 5 wherein:
   said power source is external.

7. The crossbow having an integral crank cocking and de-cocking device of claim 5, further comprising:
   at least a first micro switch to control end travel of said string retainment device.

8. The crossbow having an integral crank cocking and de-cocking device of claim 5, further comprising:
   at least a first electronic eye to control end travel of said string retainment device.

9. The crossbow having an integral crank cocking and de-cocking device of claim 5 wherein:
   said motor gearbox assembly is de-couple-able from said internal drive gear.

10. The crossbow having an integral crank cocking and de-cocking device of claim 5 wherein:
    said motor gearbox assembly is removable.

* * * * *